Jan. 22, 1924.
F. K. CHISHOLM
1,481,504
TENNIS COURT AND OTHER LINE MARKER
Filed Oct. 13, 1922    2 Sheets-Sheet 1
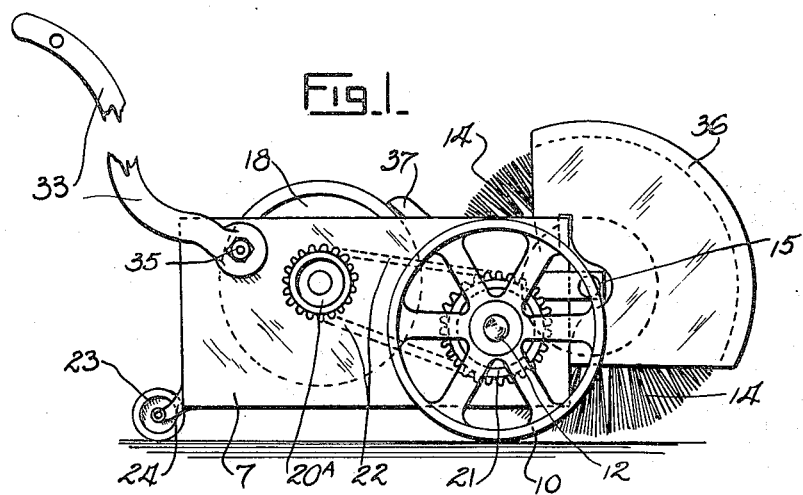
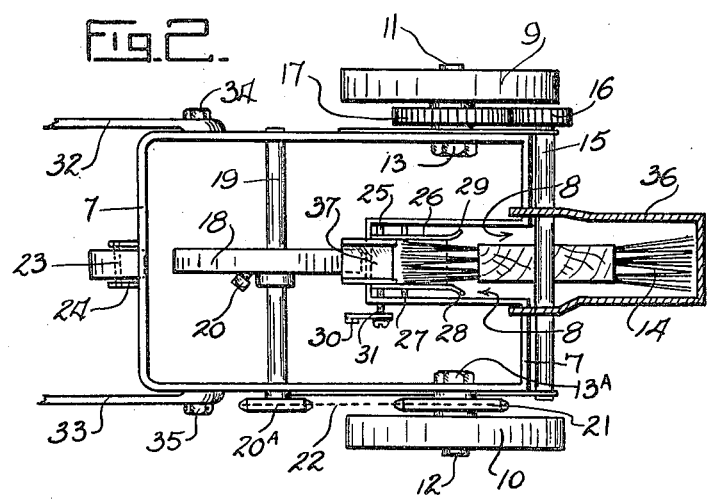

Jan. 22, 1924.  
F. K. CHISHOLM  
1,481,504  
TENNIS COURT AND OTHER LINE MARKER  
Filed Oct. 13, 1922  
2 Sheets-Sheet 2
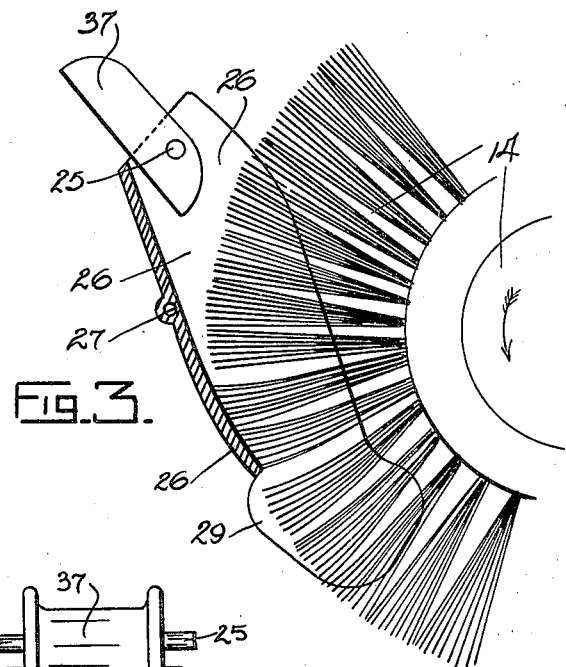
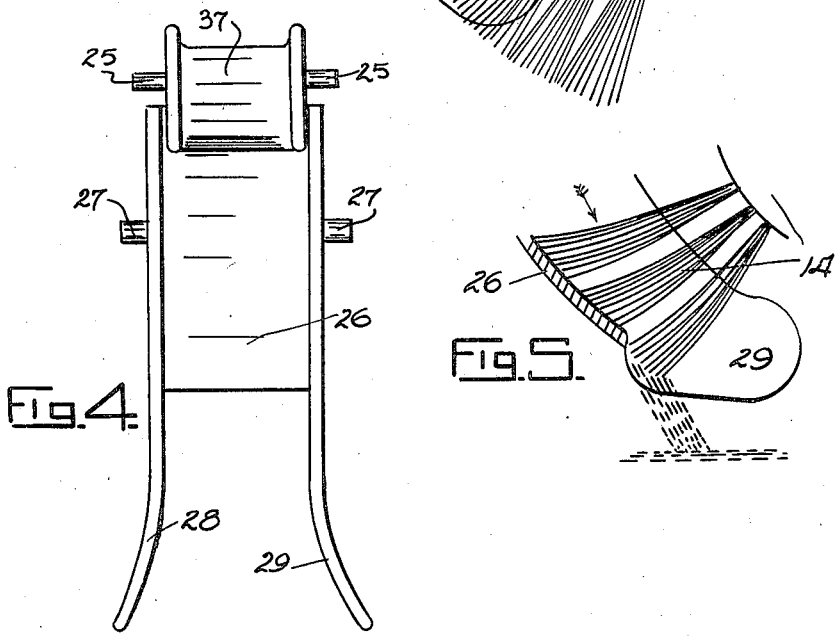
Inventor  
Frank Kerr Chisholm,  
By B. Singer. Atty.

Patented Jan. 22, 1924.

1,481,504

UNITED STATES PATENT OFFICE.

FRANK KERR CHISHOLM, OF GOULBURN, NEW SOUTH WALES, AUSTRALIA.

TENNIS-COURT AND OTHER LINE MARKER.

Application filed October 13, 1922. Serial No. 594,295.

*To all whom it may concern:*

Be it known that I, FRANK KERR CHISHOLM, a subject of the King of Great Britain, residing at Kippilaw, Goulburn, in the State of New South Wales, Commonwealth of Australia, have invented certain new and useful Improvements in Tennis-Court and Other Line Markers, of which the following is a specification.

This invention relates to improvements in machines whereby tennis courts and other places may be properly marked with a white or other colored liquid preparation, and it is especially adapted for marking clay courts.

The invention comprises a portable machine provided with ground wheels from which a brush is adapted to be revolved oppositely to a feed wheel in a liquid receptacle. This feed wheel raises a film of the liquid on its periphery which liquid, on rotation of the wheel, is carried away by a scoop in contact with the periphery to a chute into which the free ends of the brush project during its rotation. Below the brush, and slightly above the ground level, are lateral extensions of the chute forming guides for the brush. The feed wheel and rotatable brush are actuated by suitable gearing from the ground wheels, such as gear wheels or chain and sprocket wheels, so that the brush rotates oppositely to the ground wheels and the feed wheel. The chute may be curved downwardly and provided with an oblong slot or hole through which the liquid may be projected.

But in order that my invention can be more readily comprehended I will now refer to the accompanying sheets of drawings which illustrate a practical embodiment thereof.

Figure 1 is a side elevation of the complete machine, while

Figure 2 is a plan view with the brush and its cover shown in section.

Figure 3 is an enlarged sectional detail view of the scoop, chute, and brush, and Figure 4, a front elevation of the scoop and chute.

Figure 5 is a diagrammatic view showing the action of the bristles on the chute.

The same numerals indicate the same or corresponding parts throughout the drawings.

7 is the liquid receptacle or trough formed with the cut out or recessed portion 8. 9 and 10 are road wheels mounted on stub axles 11 and 12 which are bolted to the sides of the trough 7 by the nuts 13 and 13$^A$. 14 is the brush mounted on shaft 15 which is driven by the gear wheels 16 and 17 from the road wheel 9. 36 represents a detachable cover for the brush. 18 is the feed wheel adjustably secured to the shaft 19 by the set screw 20, the shaft 19 being revolved by sprocket wheel 20$^A$ mounted thereon and driven by a further sprocket wheel 21 connected to the road wheel 10 through chain belt 22. 23 is a small roller or wheel mounted in the brackets 24. Liquid is fed to the brush 14 by the scoop 37 pivoted to the recessed portion 8 of the trough at 25. 26 represents the chute pivoted at 27 to the trough, said chute 26 being formed with lateral extensions 28 and 29 splayed outwardly as shown in Figure 4 to act as guides for the brush. 30 is a small lever with screwed stem 31 for locking the chute in any desired position. 32 and 33 are handles adjustably secured to the trough 7 at 34 and 35.

In operation, as the machine is wheeled along the ground, the feed wheel 18 is revolved by the sprocket wheels 20$^A$ and 21 through the chain belt 22. This causes a film of liquid to be raised by the wheel 18, the liquid being removed by the scoop 37 which delivers it to the chute 26, the brush 14 being revolved in the opposite direction to the road wheels by the gear wheels 16 and 17. The brush as it passes the lower part of the chute picks up a quantity of liquid and on contacting with the chute 26 the brushes are bent as shown in Figure 3. When the bristles pass the end of the chute, they retract to the normal position with a flicking motion, throwing the liquid onto the ground as shown by the dotted lines in Figure 5. The ends 28 and 29 of the chute 26 are splayed or gradually turned outwardly so that as the side bristles are contracted when passing through the chute 26 they regain their normal position without any side flick of the bristles taking place, thereby ensuring a comparatively straight edge to the line being marked.

By adjusting the position of the feed wheel 18 relatively to the scoop 37, the volume of liquid picked up or transferred to the scoop may be reduced.

It is obvious that the driving gear may be modified without departing from the spirit of the invention and in some cases I may dispense with a scoop and connect the chute so that the liquid passes directly thereto from the feed wheel.

I claim:—

1. In a portable line marking machine for tennis courts and the like, a liquid receptacle, a feed wheel adapted to revolve therein, an inclined member in contact with and extending below said wheel, a rotatable brush in contact with said member and adapted to project liquid on to the ground from the bristles leaving the end thereof.

2. In a portable line marking machine for tennis courts and the like, a liquid receptacle, a feed wheel adapted to revolve in said receptacle, a scoop in contact with the periphery of said wheel, a chute below said scoop, a rotatable brush in contact with said chute and adapted to project liquid onto the ground from its bristles leaving the end of the chute.

3. In a line marking machine for tennis courts and the like provided with ground wheels, a liquid receptacle, a feed wheel adapted to revolve therein, a pivoted scoop in contact with said wheel and adapted to transmit liquid to an adjustable chute below, a brush wheel in contact with the lower end of said chute, said brush wheel being oppositely rotatable to the feed wheel and adapted to project liquid on to the ground.

4. In a line marking machine as claimed in claim 2, the combination therewith of lateral extensions or guides on the chute.

5. A line marking machine as claimed in claim 2, in which the feed wheel is adjustably mounted, whereby the volume of liquid transferred from the receptacle to the scoop may be varied.

In testimony whereof I have hereunto set my hand.

FRANK KERR CHISHOLM.